Patented Mar. 9, 1943

2,313,328

UNITED STATES PATENT OFFICE 2,313,328

PRINTING INK

Donald Robert Erickson and Paul J. Thoma, Kalamazoo, Mich., assignors to Michigan Research Laboratories, Inc., Kalamazoo, Mich.

No Drawing. Application June 4, 1942, Serial No. 445,802

4 Claims. (Cl. 260—31)

This invention relates to improvements in printing inks.

This application is a continuation in part of our application Serial No. 396,293, filed June 2, 1941, for Printing ink.

This invention relates to printing inks and particularly to inks using a varnish comprising a solvent and a binder which is soluble in the solvent and a limited quantity of water but not in the solvent and an unlimited quantity of water. Such inks are particularly desirable because they will stay open on the press even when high humidity is encountered, but they can be treated with water, for example steam or a water spray, after printing to separate some of the binder from the solvent at the surface of the printed film to thus prevent offset.

The objects of this invention are:

First, to provide a new and improved printing ink.

Second, to provide such an ink of the type above described, the printed film of which is hard, highly scuff, rub and smudge resistant, and has improved properties of adhesion.

Third, to provide such an ink with an extremely desirable body.

Fourth, to provide such an ink in which an alkyd resin is incorporated and which will stay open on the press even when high humidity conditions are encountered.

Other objects and advantages pertaining to details will appear from the description to follow.

In our improved ink, we use a liquid polyglycol as the solvent. Diethylene glycol is very satisfactory and we prefer to use a varnish in which the liquid polyglycol represents 50% by weight of the varnish.

We use a solid alkyd resin which consists of a condensation product of a polybasic acid such as phthalic anhydride, oxalic, succinic, malic, fumaric, tartaric, maleic, citric, glutaric, adipic, pimelic, suberic, azelaic, sebacic, and a polyhydric alcohol such as glycerol, ethylene glycol, all polyglycols, sorbitol, and pentaerythritol. We use such a resin which is soluble in ethyl alcohol and in the liquid polyglycol solvent. It is modified with a non-drying ethyl alcohol and liquid polyglycol soluble oil, such as castor oil, to such an extent that it is soluble in ethyl alcohol or the liquid polyglycol. The resin has a high acid number of 125 or more.

We prefer to use 10% by weight of the varnish of this alkyd resin.

With this alkyd resin, we employ a resin comprising either rosin modified by an alpha beta unsaturated organic polybasic acid, such as maleic or fumaric, or a terpene hydrocarbon of the formula $C_{10}H_{16}$ modified by the alpha beta unsaturated organic polybasic acid, or a mixture of these two resins. These resins are solid and we employ preferably 40% by weight of the varnish of these resins.

The terpene hydrocarbons which can be modified comprise alpha terpinene, beta terpinene, pinene, alpha pinene, beta pinene, dipentene, limonene, or terpinolene.

The alkyd resins are not soluble in cold diethylene glycol and they separate on standing. A solution of them has no practical water tolerance and they immediately separate from any temporary solution obtained through heating an anhydrous polyglycol to get them to go into solution on exposure to humidities such as would be encountered in a printing plant. We have found, however, that when the alkyd resin is incorporated with the other resins, a suitable ink is provided. It has the necessary water tolerance but still may be treated with water after printing to prevent offset as above set forth.

The ink has a very desirable body. It has desirable properties of adhesion and the printed film is hard and highly scuff, rub and smudge resistant.

The pigment employed is selected according to color. It is preferably insoluble in the polyglycol solvent and in water.

The terms and expressions which have been herein employed are used as terms of description and not of limitation and there is no intention in the use of such terms and expressions of excluding any equivalents of the features shown and described, or portions thereof. It is recognized that various modifications are possible within the scope of the invention claimed.

Having thus described our invention, what we claim as new and desire to secure by Letters Patent is:

1. A printing ink comprising a varnish comprising 50 parts by weight of a liquid polyglycol as a solvent, 40 parts by weight of a resin selected from the group consisting of rosin modified by an alpha beta unsaturated organic polybasic acid and a terpene hydrocarbon of the formula $C_{10}H_{16}$ modified by an alpha beta unsaturated organic polybasic acid, and 10 parts by weight of an alkyd resin soluble in ethyl alcohol and said polyglycol, comprising the condensation product of a polybasic acid and a polyhydric alcohol modified with castor oil, and a pigment.

2. A printing ink comprising a varnish stable against separation of the binder at high atmospheric humidity conditions comprising a liquid polyglycol as a solvent and a binder comprising resin selected from the group consisting of rosin modified by an alpha beta unsaturated organic polybasic acid and a terpene hydrocarbon of the formula $C_{10}H_{16}$ modified by an alpha beta unsaturated organic polybasic acid, mixed with an alkyd resin soluble in ethyl alcohol and said polyglycol, comprising the condensation product of a polybasic acid and a polyhydric alcohol modified with castor oil, and a pigment.

3. A printing ink comprising a varnish comprising 50 parts by weight of a liquid polyglycol as a solvent, 40 parts by weight of a resin selected from the group consisting of rosin modified by an alpha beta unsaturated organic polybasic acid and a terpene hydrocarbon of the formula $C_{10}H_{16}$ modified by an alpha beta unsaturated organic polybasic acid, and 10 parts by weight of an alkyd resin soluble in ethyl alcohol and said polyglycol, comprising the condensation product of a polybasic acid and a polyhydric alcohol modified with a non-drying ethyl alcohol liquid polyglycol soluble oil, and a pigment.

4. A printing ink comprising a varnish stable against separation of the binder at high atmospheric humidity conditions comprising a liquid polyglycol as a solvent and a binder comprising resin selected from the group consisting of rosin modified by an alpha beta unsaturated organic polybasic acid and a terpene hydrocarbon of the formula $C_{10}H_{16}$ modified by an alpha beta unsaturated organic polybasic acid, mixed with an alkyd resin soluble in ethyl alcohol and said polyglycol, comprising the condensation product of a polybasic acid and a polyhydric alcohol modified with a non-drying ethyl alcohol liquid polyglycol soluble oil, and a pigment.

DONALD ROBERT ERICKSON.
PAUL J. THOMA.